No. 648,341. Patented Apr. 24, 1900.
J. W. BOCH.
DIE FOR POTTERY WARE.
(Application filed Feb. 10, 1900.)
(No Model.)
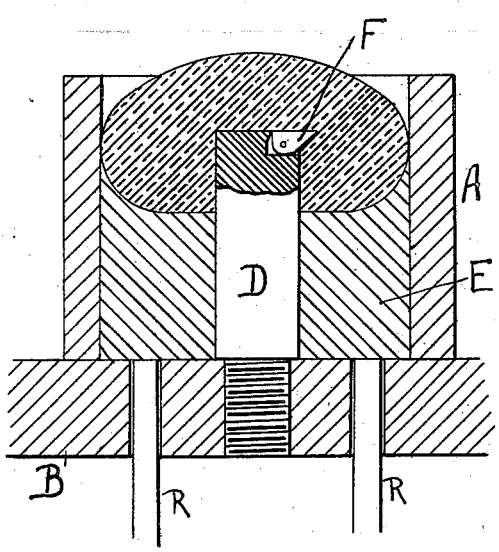
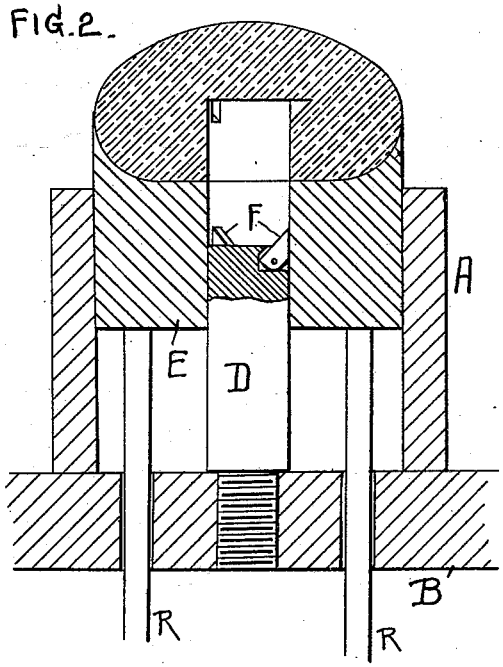
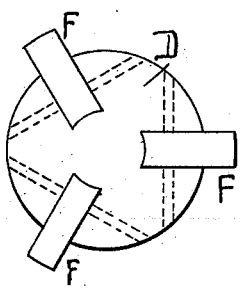
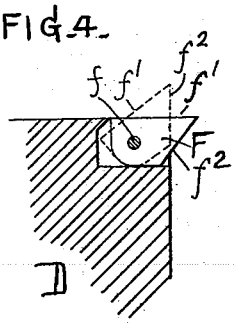
WITNESSES:
F. W. Wright
S. C. Connor
INVENTOR
JOHN W. BOCH
BY
Howson and Howson
HIS ATTORNEYS.
THE NORRIS PETERS CO., PHOTO-LITHO., WASHINGTON, D. C.

UNITED STATES PATENT OFFICE.

JOHN W. BOCH, OF EAST LIVERPOOL, OHIO.

DIE FOR POTTERY-WARE.

SPECIFICATION forming part of Letters Patent No. 648,341, dated April 24, 1900.

Application filed February 10, 1900. Serial No. 4,761. (No model.)

*To all whom it may concern:*

Be it known that I, JOHN W. BOCH, a citizen of the United States of America, and a resident of East Liverpool, county of Columbiana, State of Ohio, have invented an Improved Die for Pottery-Ware, of which the following is a specification.

The object of my invention is to construct a simple but efficient die for molding pottery-ware, more particularly such as for molding the shank-openings in pottery-ware knobs for doors.

In the accompanying drawings, Figure 1 is a vertical section of sufficient of a door-knob mold provided with my die to illustrate my invention. Fig. 2 is a similar view, but showing the molded clay knob being ejected. Fig. 3 is an enlarged plan view of my die. Fig. 4 is an enlarged sectional view of the same.

In the molding of pottery-ware knobs for doors it is desirable to form within the opening for the reception of the metal shank undercut recesses, whereby the shank and knob may be locked together by the soft metal poured in or otherwise. A means for making such internal recesses is illustrated in Patent No. 373,572, dated November 22, 1887, and consists of a hollow plug having two opposite mortises through which work claws hinged to an internal actuating-rod. By moving this rod upward by a treadle its hinged claws are projected laterally on coming into contact with central cam-surfaces at the top, and when the clay has been molded the claws have to be positively drawn back into the plug by pulling down the rod before the molded knob can be removed from the die.

One of the objects of my invention is to simplify the construction of the means for forming the recesses, so that the action of such means will become automatic and mechanical actuating devices be dispensed with. At the same time by dispensing with mechanical actuating devices I am enabled to provide room for a third claw or finger to form an additional recess in the shank-opening.

In the drawings, A is a part of the mold fixed upon a base-plate B, to which is also fixed the central male die D, whose upper or outer end is to form the shank-opening in the molded knob.

E is a vertically-sliding block constituting in use a part of the mold or die and which may be raised and lowered within the mold A by any suitable means, as by rods R R.

To the outer or upper end of the central male die D, I pivot at $f\ f$ three claws or fingers F to project radially from the axis of the die, as shown in Fig. 3. These claws or fingers can swing vertically on their pivots from the outwardly-projecting position shown in Fig. 1 to the upwardly or longitudinally projecting position shown in Fig. 2. When in the position, Fig. 1, their upper surfaces $f'$, Fig. 4, are flush with the top of the die D. When turned up to the position shown in Fig. 2, the inclined under surfaces $f^2$ of the claws or fingers are flush with the vertical sides of the die D. When the clay is pressed into the mold, the claws will automatically and naturally take the outwardly-projecting position, (shown in Fig. 1;) but upon projecting the sliding block E upward to eject the molded knob the fingers or claws F will automatically turn to the longitudinally-projecting position, (shown in Fig. 2 and by dotted lines in Fig. 4,) drawing out of the opening and leaving therein the undercut recesses perfectly formed, as indicated in Fig. 2.

I claim as my invention—

1. In a pottery-ware mold, a male die having pivoted to it fingers F free to move from outwardly-projecting positions to longitudinally-projecting positions in combination with means for ejecting the molded article, substantially as described.

2. In a pottery-ware mold, a male die having pivoted to it fingers F free to move from outwardly-projecting positions to longitudinally-projecting positions, in combination with a lower mold having therein a movable block to eject the molded article, substantially as described.

In testimony whereof I have signed my name to this specification in the presence of two subscribing witnesses.

JOHN W. BOCH.

Witnesses:
SARAH CARSON CONNOR,
F. WARREN WRIGHT.